Nov. 4, 1969   L. T. LEE   3,476,357
MILK INLET SEALING DEVICE
Filed Sept. 20, 1967   2 Sheets-Sheet 1

INVENTOR
LLOYD T. LEE

BY Kimmel, Crowell & Weaver
ATTORNEYS.

Nov. 4, 1969         L. T. LEE          3,476,357
           MILK INLET SEALING DEVICE
Filed Sept. 20, 1967                2 Sheets-Sheet 2

INVENTOR
LLOYD T. LEE

BY Kimmel, Crowell & Weaver
ATTORNEYS.

United States Patent Office 3,476,357
Patented Nov. 4, 1969

3,476,357
MILK INLET SEALING DEVICE
Lloyd T. Lee, 818 S. 3rd St.,
La Crosse, Wis. 54601
Filed Sept. 20, 1967, Ser. No. 669,085
Int. Cl. F16k 51/00
U.S. Cl. 251—151                                    10 Claims

ABSTRACT OF THE DISCLOSURE

A single device for selectively sealing in of a T-manifold opening and for retaining a nipple in the manifold opening which includes a housing rotatably mounted on the manifold, a plate with a sealing plug therein which is curved so that in one position of the housing the sealing plug closes the manifold opening and in another position of the housing fingers on the plate engage a flange on a nipple to retain the nipple in the manifold opening and a cam operator for moving and locking the plate in position is disclosed.

CROSS REFERENCE TO RELATED APPLICATION

This invention constitutes an improvement over my prior invention which is disclosed in application Ser. No. 598,702, filed Dec. 2, 1966.

BACKGROUND OF THE INVENTION

Field of the invention

This invention relates to a manifold for a milking parlor of the type described in my prior application. In particular, this invention relates to a sealing device for a sanitary T-manifold of the type described.

Description of the prior art. As described in my prior application, manifolds and T-manifolds generally are known. It is recognized that it is important in a milking parlor to provide a manifold system, for carrying milk to the cooling chamber, which is easily cleaned and may easily be maintained in sanitary condition. Such manifolds are frequently used to distribute a vacuum to the milking area for operating the milking machines, as well. As previously described, it is also important to provide means for sealing the manifold and securing connectors therein which are easily cleaned and which can be maintained in sanitary condition. It will also be recognized that all the fittings associated with the manifold should be easily removable for cleaning since it is very difficult to maintain sanitary conditions under the adverse conditions of a milking parlor generally. It is, therefore, a principal object of the present invention to provide a combination sealing and nipple retaining device which is easily removable from a milking parlor manifold.

SUMMARY

The present invention may be described as a generally open housing which is resiliently and rotatably secured to a main conduit of a manifold T-system and which extends over a T-plate is pivotally and reciprocably received in a slot in the housing and is biased outwardly to the release position. The plate has a resilient plug member for being received in the open end of the manifold T and has a pair of fingers which engage a flange on a nipple to hold the nipple in the open end of the T, as may be desired. The blade is pivotally and reciprocably moved to a closed position by means of a cam operator which has a camming surface and a locking surface engaging the plate. It will be understood that the description herein is exemplary of the invention and is not intended in the limtiing manner.

Accordingly, it is an object of the invention to provide a combination sealing and retaining device which is resiliently and rotatably secured to a manifold for easy removal therefrom.

It is also an object of the invention to provide a sealing and retaining device which has a novel combination pivotal and reciprocable movement for selectively closing the end of a manifold T and for retaining a nipple in the manifold T.

An additional object of the invention is to provide a novel cam operated closure and retaining means.

Yet another object of the invention is to provide a closure and retaining means which may either close off the end of a T or retain a nipple therein according to the position of a housing on a main manifold conduit.

A specific construction shown in the drawings and described constitutes an object of the invention. Other objects will be apparent from the drawings to which reference is made and from the specification which follows.

BRIEF DESCRIPTION OF THE DRAWINGS

FIGURES 1, 2, 3, and 4 showing the housing in a first position and the device in the sealing position.

DESCRIPTION OF THE PREFERRED EMBODIMENT

Figure 5:
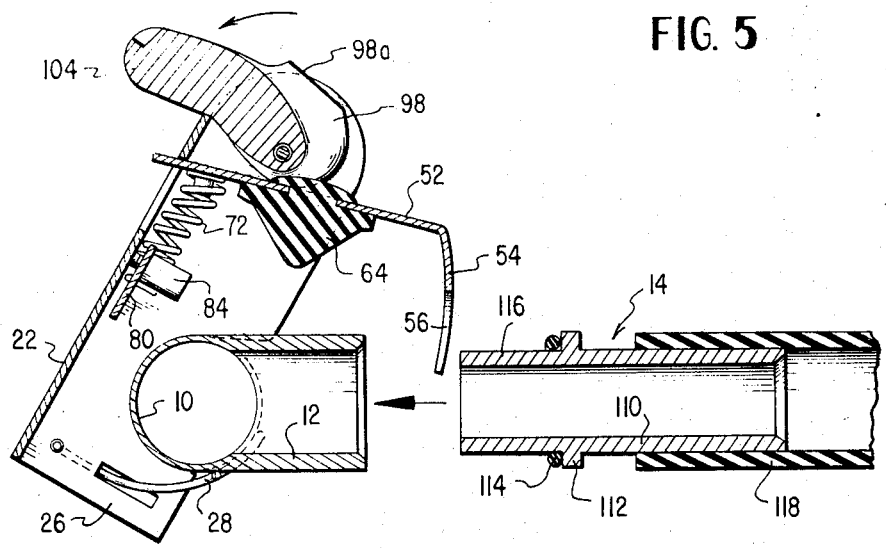
FIGURE 5 shows the housing in a second position preliminary to engagement with a nipple showing the parts in cross section taken substantially along a longitudinal center line.
Figure 6:
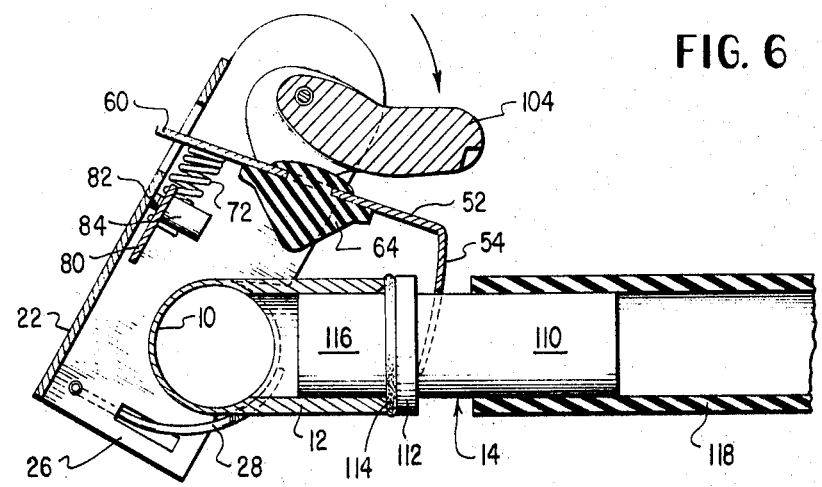
FIGURE 6 shows the invention of FIGURE 5 in retaining position securing the nipple in the end of the T and is taken along a longitudinal center line showing the parts in cross section.

The present invention is intended for use with a manifold which includes a main manifold conduit 10 and a plurality of inlet tubes 12 which form T conduit extensions. As illustrated in FIGURES 5 and 6, it is intended also that a nipple 14 be received in the T extension.

Figure 1:
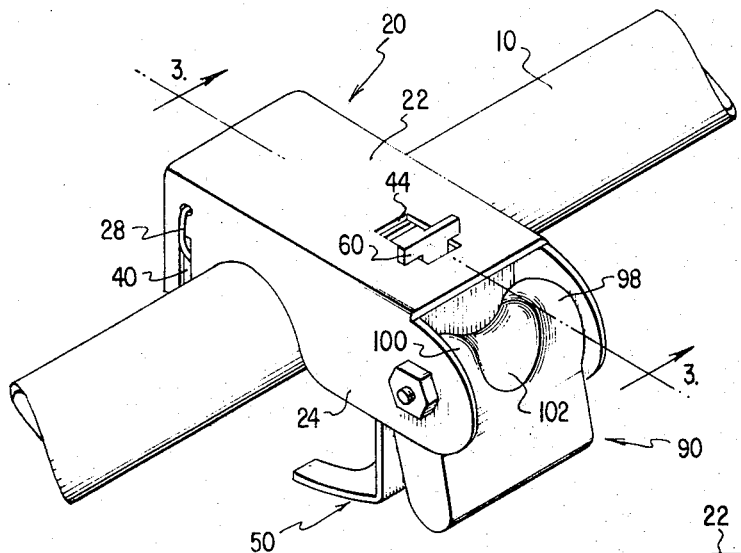
FIGURE 1 is a perspective view of the sealing device of this invention shown in position on a manifold T sealing off the end of the manifold T inlet.
Figure 2:
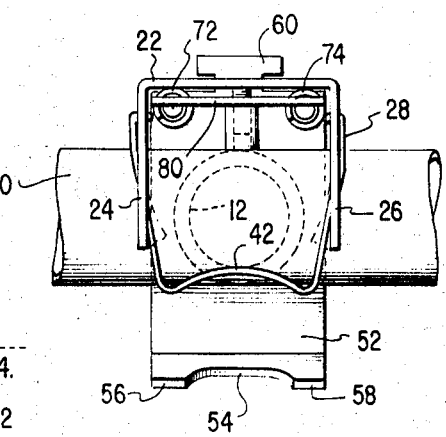
FIGURE 2 is a rear view of the invention of FIGURE 1 showing the relative position of the sealing device on the manifold.

The present invention includes a clamp housing 20 which has an upper member 22 and downwardly extending sides 24 and 26 which, as best shown in FIGURE 1, are so curved and formed as to rotatably rest on the main manifold conduit 10.

The housing is maintained on the main manifold by a spring clip 28 which is generally U-shaped and which includes a pair of curved arcuate legs 30 and 32 provided with inwardly extending engaging fingers 34 and 36. The curved legs extend through slots 38 and 40 from the inside to the outside and the engaging fingers are received in apertures in the side walls 24 and 26 of the housing. The back portion of the spring clip is provided with an arcuate reversion 42 which as best shown in FIGURES 5 and 6, is adapted to fit over the lower edge of the extension 12.

The housing is provided with a slot 44 in the top which, in cooperation with other parts, performs a very important function as will be described.

A plate 50 which includes a flat seal carrying portion 52 and a curved extension 54 which is provided with retaining fingers 56 and 58 is pivotally and reciprocably held to the housing by a T extension 60, which, as best shown in FIGURE 1, extends through the slot 44 and supports the plate in the housing. It will be apparent that the T extension 60 is free to pivot and reciprocate in the slot 44.

An aperture 62 is provided in the plate for receiving a sealing plug 64 which is held in place by a retaining flange portion 66 extending through the aperture 62 and engaging the back side of the plate. The plug 64 is, preferably, formed of a resilient material such as hard rubber or the like or may be formed of resilient or semi-resilient plastic such as the vinyl and related polymers and certain polyolefins.

Figure 3:
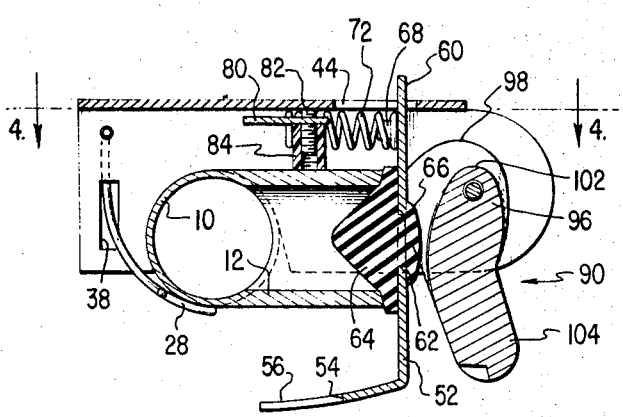
FIGURE 3 is a side view cross section taken substantially along line 3—3 in the direction of the arrows as shown in FIGURE 1.
Figure 4:
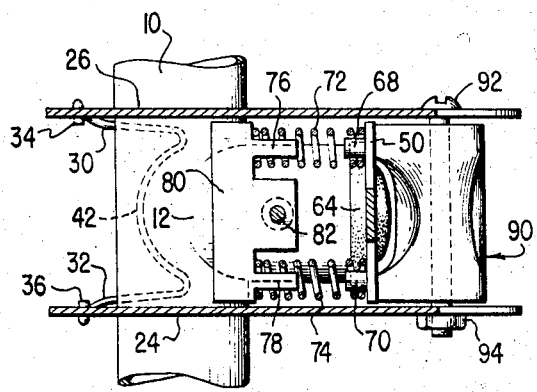
FIGURE 4 is a top view in cross section taken substantially along lines 4—4 in the direction of the arrows as shown in FIGURE 3.

A pair of guide pins 68 and 70, best shown in FIGURE 4, retain a pair of biasing compression springs 72 and 74 which are retained, on the other end, by retaining fingers 76 and 78 on a retaining plate 80. The retaining plate 80 is secured to the housing by a retaining bolt 82 and a stop member 84 which, as best shown in FIGURE 3, is adapted to engage the top of the T extension 12 to fix the housing in a first position. The stop member 84 is preferably made of a hard plastic material such as the acrylic plastics, polystyrene and similar polymers. It should be pointed out that all the materials used should be capable of being sterilized without being adversely effected. To this end, it will be understood, that according to preferred practice the manifold is made of smooth stainless steel tubing with all the well joints carefully smoothed and finished and that all the components of the present device are made of stainless steel except the resilient sealing plug and the stop member. Of course, a stainless steel stop member could also be used but is not preferred.

Plate 50 is pivotally and reciprocably moved from a release position, as best shown in FIGURE 5, to a close position, best shown in FIGURES 3 and 6, by means of an over-center cam member 90. The cam member is pivotally secured in the housing by means of a bolt 92 and a nut 94. The cam member is provided with a pivot center portion 96 under which are formed a pair of camming surface members 98 and 100 which also include cam locking portions 98a, shown in FIGURE 5 and a similar portion 100a which is not shown. A center clearance recess 102 is provided between the camming surfaces to clear the retaining portion 66 of the resilient seal plug 64. An operator portion or handle 104 is provided for rotating the cam member 90.

As best shown in FIGURES 5 and 6, it is desired to secure the nipple 14 in the inlet opening of the T. The nipple 14 includes a tubular portion 110 which has, preferably, integrally formed thereon a flange 112 which is secured by means of a gasket 114, against the end of extension 12 as the inner end 116 is received therein. A flexible tube 118, which may be made of chlorinated rubber such tubing being sold under the trademark Tygon. Other type of tubing, as well, can also be used. The tubing, as described in my prior application, carries the milk to the manifold from the milking machine proper.

OPERATION

The housing has two positions, the first position being shown in FIGURES 1 through 4 and the second position being shown in FIGURES 5 and 6. In the first position, with the plate in release position, that is with cam operator exerting minimum force thereon, best shown in FIGURE 5, the seal plug 64 is spaced from but in a rather close proximity to the open end of the extension 12. As the cam operator is moved the cam surfaces 98 and 100 pivot to reciprocably move the plate 50 toward the end of the extension 12 so that, as best shown in FIGURE 3, the seal plug 64 is received in the end of the extension 12 and forms a fluid tight seal therewith. As illustrated, the seal plug 64 is preferably of a conical shape, being constructed and adapted to be received in the end of the extension 12 to provide a self-centering action to permit the flange portions of the seal plug to mate properly in the end of the extension. The cam surfaces 98 and 100 bearing against the outer side of the plate force the plug against the end of the extension and the locking surfaces 98a and 100a retain the plate in such position. To release, it is simply necessary to move the operator portion 104 upwardly, as indicated by the arrow in FIGURE 5, and this permits the plate to pivot and reciprocate by the action of the springs 72 and 74 to remove the plug from the opening.

As shown in FIGURES 5 and 6, when the housing is in the second position the nipple 14 may be inserted. Then, as the housing is moved slightly downwardly the fingers 56 and 58 engage the flange 112. Then by moving the cam operator downwardly as indicated by the arrow in FIGURE 6, the plate pivots and reciprocates in the slot 44 forcing the flange toward the end of the extension 12 forming a fluid tight seal by means of gasket 114. The seal is maintained, again, by the locking surfaces 98a and 100a bearing against the outer surface of the plate 40.

It will be apparent from the foregoing that the T may be either sealed with the plug or the nipple may be retained therein by a very simple manual operation which can be performed in just a second or two. Furthermore, and it is important to note, that the entire sealing and retaining device is secured on the manifold by a spring clip arrangement and a simple manipulation permits easy removal thereof for cleaning and sterilization. Furthermore, the device may be easily removed for repair or adjustment as necessary. In practice, with a number of spare sealing devices, the sealing devices previously used can be removed simply from the manifold and a new clean device be placed thereon in a few seconds.

Further, it will be noted that there are a minimum of curved portions and corners which tend to accumulate dirt, and such dirt and filth can be removed by totally emersing and scrubbing the entire device followed by sterilization. Since the manifold is made entirely of smooth stainless steel tubing and has no threads or other corners, it can easily and thoroughly be cleaned without removal. It is difficult to over emphasize the importance of cleanability both of the manifold and of the sealing and retaining device of this invention.

It will be apparent from the foregoing that the present sealing device has many very significant, important and, from a health point of view, vital advantages over the sealing devices of the prior art. It will further be understood that the invention is described with reference to a specific embodiment of the invention but that the embodiment is exemplary and that the drawings, description and specification are intended merely as exemplary of the invention not in a limiting sense.

I claim:

1. The combination sealing and retaining device for selectively closing an opening in a sanitary manifold T and for retaining a nipple connector in said opening, which comprises:

a housing constructed for extending over the main manifold conduit and over the extension of the manifold T;

means for securing the housing rotatably to the main manifold conduit for permitting relative movement therebetween;

a combination closing and retaining plate pivotally connected to the housing which includes a first portion constructed and disposed to extend over the T opening when said plate is in a first position and which also includes a second portion having nipple engaging means for retaining the nipple in the opening when said plate is in a second position;

a seal plug secured to the first portion for forming a substantially fluid tight seal over the T opening in the first position; and operating means for moving the plate and selectively locking the plate in either the first position or the second position.

2. The device of claim 1 wherein the operating means comprises:

means including at least one cam surface bearing against the plate for pivotally moving the plate from a release position to a close position;

wherein the housing is so constructed and disposed that in a first position the seal plug is normally in spaced proximity to the opening and movement of the operating means forms the seal and in a second position the nipple engaging means are in spaced proximity to the portion of the nipple to be engaged and movement of the operating means locks the nipple in the opening by the engaging means.

3. The device of claim 2 further comprising:

bias means secured for urging the plate against the cam surface and toward the release position.

4. The device of claim 3 further comprising:

stop means on the housing for limiting movement of the housing and positioning the seal plug in spaced proximity in front of the opening.

5. The device of claim 3 wherein the seal plug comprises:

means connecting the plug to the plate; and a generally conical sealing means so constructed and disposed relative to the opening to be closed so as to be self centering in the opening upon formation of the seal.

6. In combination with a sanitary manifold T of the type which includes a main conduit portion, a conduit extension portion in communication therewith, and a nipple connector for being selectively received in the conduit extension, a device for selectively sealing the end of the conduit extension for keeping the manifold sanitary and preventing entry of air thereinto and for retaining the nipple in the extension, comprising:

a generally open housing extending over the main conduit and the extension, said housing being so constructed as to rotate about the main conduit;

a resilient retaining member for removably holding the housing in rotatable relation with the main conduit;

a plate having a first relatively flat portion and a second portion bent relative to the first portion, said second portion including engaging fingers said plate being pivotally carried by the housing;

a resilient seal plug secured to the first portion of the plate; and a closure operator carried by the housing for pivotally moving the plate relative to the housing from a release position to a close position;

said plate being so constructed and connected to the housing that when the housing is in a first position the seal plug is in spaced proximity to the end of the extension when the plate is in the release position and the plug is in sealing contact with the end of the extension when the plate is in the close position;

said plate being so bent and constructed that when the housing is in a second position the engaging fingers are spaced from the end of the extension when the plate is in release position and the fingers engage the nipple when the plate is in the close position to secure the nipple in the extension.

7. The combination of claim 6 wherein the operator comprises:

a cam member pivotally secured to the housing, said member having at least one cam surface and at least one locking surface, said surfaces being so formed on the cam member that rotation of the cam member moves the plate pivotally by means of the cam surface and further rotation of the cam member locks the plate in close position by the locking surface contacting the plate.

8. The combination of claim 7 further comprising:

at least one spring means biasing the plate pivotally and reciprocably to the release position.

9. The combination of claim 8 wherein the seal plug is constructed to be self-centering in the end of the extension.

10. The combination of claim 9 further comprising:

a stop on the housing for engaging the extension to limit movement of the housing at the first position.

References Cited

UNITED STATES PATENTS

| 2,881,010 | 4/1959  | Bouma    | 251—146 |
| 3,010,739 | 11/1961 | Boudreau | 251—146 |
| 3,272,471 | 9/1966  | McCullah | 251—146 |

M. CARY NELSON, Primary Examiner

WILLIAM R. CLINE, Assistant Examiner

U.S. Cl. X.R.

251—146